United States Patent
Wang et al.

(10) Patent No.: US 8,224,651 B2
(45) Date of Patent: *Jul. 17, 2012

(54) SYSTEM AND METHOD FOR HAZARD MITIGATION IN VOICE-DRIVEN CONTROL APPLICATIONS

(75) Inventors: Gang Wang, San Diego, CA (US); Chengyi Zheng, Goleta, CA (US); Heinz-Werner Stiller, Jestetten (DE); Matteo Contolini, Santa Barbara, CA (US)

(73) Assignee: Storz Endoskop Produktions GmbH (DE)

( * ) Notice: Subject to any disclaimer, the term of this patent is extended or adjusted under 35 U.S.C. 154(b) by 273 days.

This patent is subject to a terminal disclaimer.

(21) Appl. No.: 12/105,827

(22) Filed: Apr. 18, 2008

(65) Prior Publication Data

US 2009/0030695 A1 Jan. 29, 2009

Related U.S. Application Data

(63) Continuation-in-part of application No. 11/527,142, filed on Sep. 26, 2006.

(51) Int. Cl.
*G10L 21/00* (2006.01)
(52) U.S. Cl. ........................ 704/275; 704/270
(58) Field of Classification Search ............ 704/275, 704/270
See application file for complete search history.

(56) References Cited

U.S. PATENT DOCUMENTS

| | | | |
|---|---|---|---|
| 5,305,244 A * | 4/1994 | Newman et al. ............ 708/141 |
| 5,345,538 A | 9/1994 | Narayannan et al. | |
| 5,970,457 A | 10/1999 | Brant et al. | |
| 6,007,228 A * | 12/1999 | Agarwal et al. ............... 700/94 |
| 6,266,635 B1 | 7/2001 | Sneh | |
| 6,278,975 B1 | 8/2001 | Brant et al. | |
| 6,463,361 B1 | 10/2002 | Wang et al. | |
| 6,587,818 B2 | 7/2003 | Kanevsky et al. | |
| 6,591,239 B1 | 7/2003 | McCall et al. | |
| 6,601,026 B2 | 7/2003 | Appelt et al. | |
| 6,642,836 B1 | 11/2003 | Wang et al. | |
| 2002/0183894 A1 | 12/2002 | Wang et al. | |
| 2003/0197590 A1 | 10/2003 | Wang et al. | |
| 2004/0124964 A1 | 7/2004 | Wang et al. | |
| 2004/0128137 A1 | 7/2004 | Bush et al. | |
| 2004/0172011 A1 | 9/2004 | Wang et al. | |
| 2005/0021336 A1 * | 1/2005 | Katsuranis ................... 704/246 |
| 2005/0033580 A1 | 2/2005 | Wang et al. | |
| 2007/0061067 A1 * | 3/2007 | Zeinstra et al. ............... 701/200 |
| 2007/0156405 A1 * | 7/2007 | Schulz et al. ................ 704/255 |

FOREIGN PATENT DOCUMENTS

| | | |
|---|---|---|
| EP | 1054390 A2 | 11/2000 |
| EP | 1349146 A1 | 10/2003 |

OTHER PUBLICATIONS

Extended European Search Report, Aug. 12, 2008, 8 Pages.

* cited by examiner

*Primary Examiner* — Talivaldis Ivars Smits
*Assistant Examiner* — Shaun Roberts
(74) *Attorney, Agent, or Firm* — St. Onge Steward Johnston & Reens LLC

(57) ABSTRACT

A speech recognition and control system including a sound card for receiving speech and converting the speech into digital data, the sound card removably connected to an input of a computer, recognizer software executing on the computer for interpreting at least a portion of the digital data, event detection software executing on the computer for detecting connectivity of the sound card, and command control software executing on the computer for generating a command based on at least one of the digital data and the connectivity of the sound card.

19 Claims, 4 Drawing Sheets

SYSTEM AND METHOD FOR HAZARD MITIGATION IN VOICE-DRIVEN CONTROL APPLICATIONS

CROSS-REFERENCE TO RELATED APPLICATIONS

This application is a continuation-in-part of U.S. patent application Ser. No. 11/527,142 filed on Sep. 26, 2006.

FIELD OF THE INVENTION

The invention relates to speech recognition and control systems, and more specifically to a speech recognition and control system including a means for mitigating risks and hazards.

BACKGROUND OF THE INVENTION

Speech recognition is the process by which an acoustic signal received by microphone is converted to a set of text words, numbers, or symbols by a computer. These recognized words then can be used in a variety of computer software applications for purposes such as document preparation, data entry, and command and control. For example, speech recognition systems may be used in modern operating rooms to control various medical systems and devices. A surgeon or other user, by giving a simple voice command, may direct the functionality of a device controlled by the speech recognition system. For example, the surgeon may deliver a voice command to adjust a patient table or adjust the pressure of a pump.

To enable speech recognition or voice-driven device control in an operating room, medical devices and/or other equipment are connected with a component (e.g., a call system) through communication channels (e.g., an Ethernet connection, device bus, etc.). A speech recognition application is also connected, providing the voice driven user interface and recognition software. When a voice command is issued, the command may be recognized and converted to a text string. If it is successfully identified as valid command corresponding to one of the connected devices or applications, the system will send an appropriate signal so that the desired control action is taken.

Control systems, and particularly speech or voice-driven control systems, often do not provide 100% command accuracy. Excluding human error, errors in speech recognition and control systems may be categorized into three classes: deletion error, substitution error, and insertion error. An example of deletion error is when the speech recognition system fails to identify a valid command correctly and rejects the valid command as an out-of-vocabulary input. A substitution error occurs, for example, when a valid command is issued but the speech recognition system incorrectly identifies the command and produces a result in accordance with another command in the system's vocabulary. An insertion error occurs, for example, when an out-of-vocabulary input, such as a human utterance or a background noise, is mistakenly identified as a command. In an operating room setting where accuracy is critical, such inaccuracies are highly undesirable and potentially life threatening.

When such errors occur, prior art systems generally lack means for a user to take immediate action to mitigate the hazard. For example, prior art speech recognition and control systems have an inherent time delay. Typically such systems must wait to receive and process a complete utterance prior to producing a result. Therefore, it is difficult for a user to take immediate action to prevent a hazard when an error is realized. Further, in the case of errors caused by a continuous background noise, such systems are often blocked from receiving valid voice commands until the background noise ceases.

It is therefore desired to provide a speech recognition system and method which overcomes the above-described problems associated with prior art systems.

SUMMARY OF THE INVENTION

According, it is an object of the present invention to provide a speech recognition and control system having a means to mitigate hazards and risks.

It is a further object to provide a speech recognition and control system that utilizes real-time audio and speech events for risk and hazard mitigation and to resolve risks and hazards before they present a problem.

These and other objectives are achieved by providing a speech recognition and control system including a receiver for receiving an audio input, an event detector for analyzing the audio input and identifying at least one event of the audio input, a recognizer for interpreting at least a portion of the audio input, a database including a plurality of rules, and a controller for generating a control command based on the at least one event and at least one rule. The event may be, for example, an utterance start, an utterance end, an audio input duration exceeding a predetermined duration, or an audio input duration that is less than a predetermined duration. The event may further be an input signal error or receiver malfunction.

Further provided is a method of mitigating hazards in a voice-driven control system, including the steps of receiving an audio input, identifying at least one event of the audio input, determining a system status, determining whether a hazard mitigation action is necessary based on the at least one event, the system status, and at least one rule, and generating a control command based on the at least one event, the system status, and the at least one rule. The control command may be sent to a device operable by the voice-driven control system. The control command may also countermand a previous speech command either being executed by the system or which was already executed by the system and sent to the device.

Other objectives are achieved by providing a speech recognition and control system including a sound card for receiving speech and converting the speech into digital data, the sound card removably connected to an input of a computer such as a universal serial bus input, recognizer software executing on the computer for interpreting at least a portion of the digital data, event detection software executing on the computer for detecting connectivity of the sound card, and command control software executing on the computer for generating a command based on at least one of the digital data and the connectivity of the sound card. The command may be indicative of a visual or audio alert if a disconnection of the sound card is detected.

In some embodiments, the system further includes a plurality of medical devices controllable by the system wherein the command directs at least one of medical devices to stop or commence an action if a disconnection of said sound card is detected.

Other objectives are achieved by providing a method of mitigating hazards in a voice-driven control system including the steps of removably connecting a sound card external to a computer via an input, receiving speech via the sound card, converting the speech into digital data, determining connectivity of the sound card, determining whether a hazard mitigation action is necessary based on at least one of the digital data and the connectivity, and generating a command based on at least one of the digital data and the connectivity.

DETAILED DESCRIPTION OF THE INVENTION

Figure 1A:
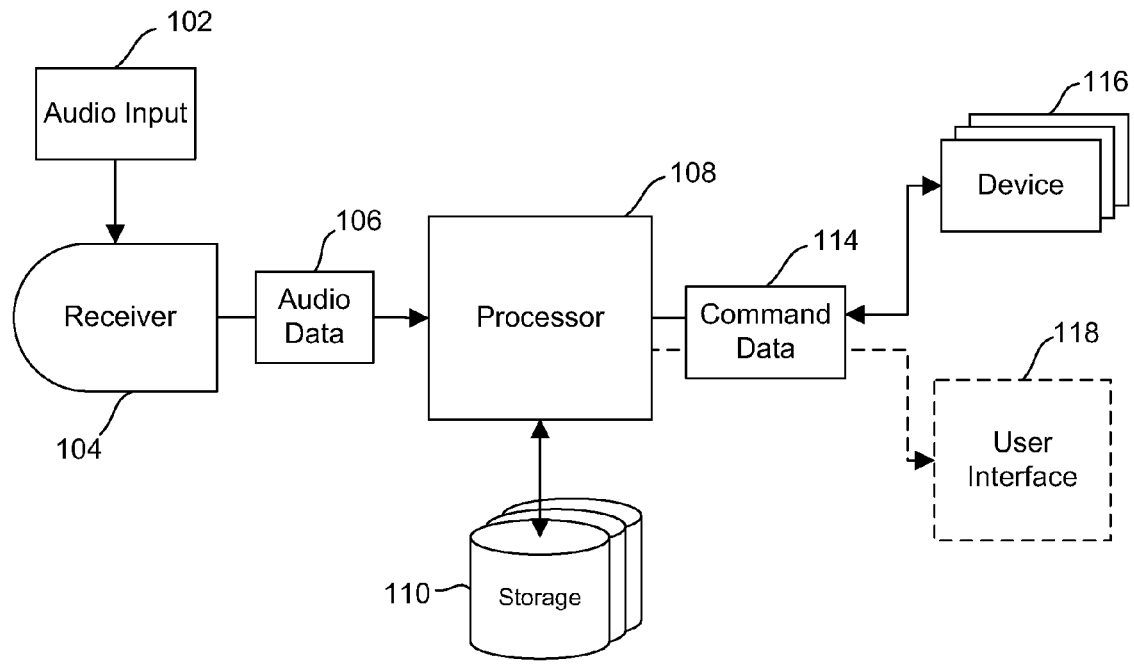
FIG. 1A is a schematic diagram of a system according to the present invention.

FIG. 1A shows a speech recognition and device control system according to the present invention. The system may be useful for any number of applications including, for example, control of devices, applications and/or processes in a medical operating room.

The system includes one or more receivers 104 for receiving audio input 102. The receiver 104 may be any instrument, device, or "front-end" for receiving an incoming sound or sound wave and converting it into a digital waveform and/or an electric current or electric energy (e.g., audio data 106). For example, the receiver 104 may be a microphone. The receiver 104 may communicate information (e.g., audio data) to the system via a communication channel or cable and/or a wireless connection.

Figure 1B:
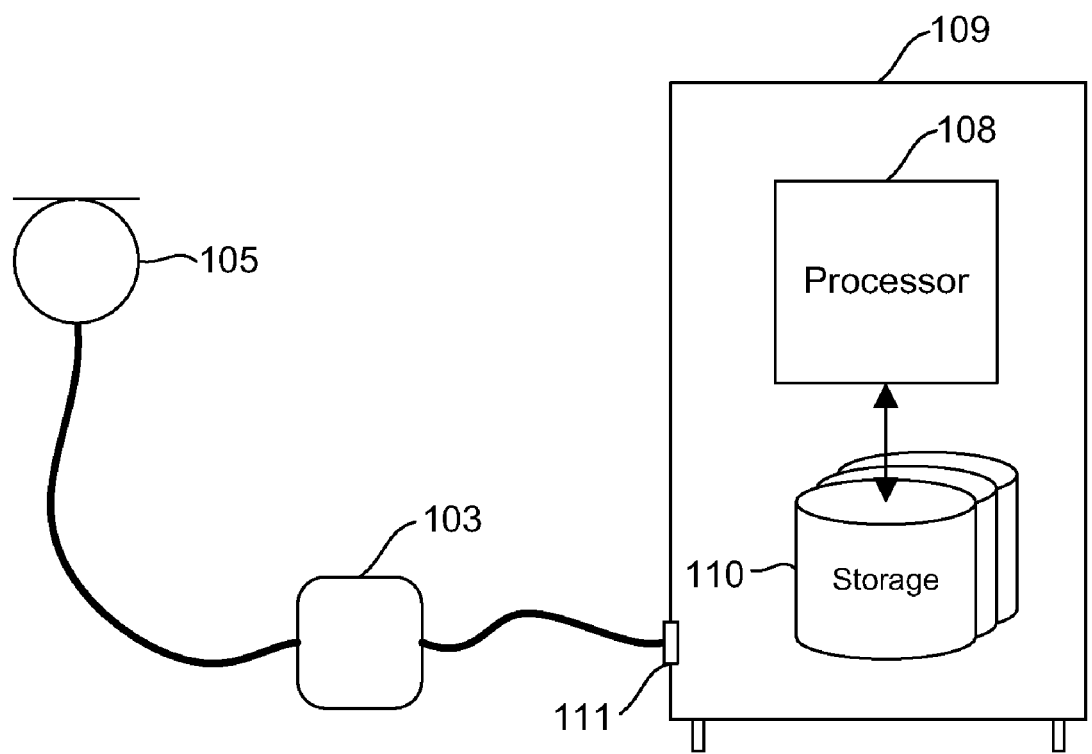
FIG. 1B is another schematic diagram of the system shown in FIG. 1A.

In some embodiments, the receiver 104 includes at least one sound card 103 (see, e.g., FIG. 1B). The sound card 103 may include a digital-to-analog converter and any number of audio inputs and outputs. The sound card 103 is preferably external to a computer 109 including the processor 108 and is removably connected via an input 111 of the computer 109. The sound card 103 may be removably connected into a standardized interface input 111 such as a universal serial bus ("USB") input. The input 111 may also be an IEEE 1394 interface input and/or FireWire input. One or more microphones 105 may also be plugged into the external sound card 103, or integrated therein, for receiving the audio input 102 and/or speech. The use of an external sound card 103 provides superior audio quality to an internal sound card because it is not affected by the various noises within the computer 109 that can degrade the soundcard's input and output quality. The sound card 103 may be located in close proximity to the computer 109 or any distance away from the computer 109.

The audio input 102 received by the receiver 104 may be a spoken utterance from a user, such as a spoken word or phrase, or a collection of words or phrases. For example, the audio input 102 may include spoken words or phrases indicative of one or more speech commands which a user desires to be communicated or implemented by the system. The audio input 102 may further be any human utterance, e.g., not intended as a speech command, or any background noise and/or interference. For example, a connection or disconnection of the receiver 104 may cause noise or interference in the front end.

The system may further include one or more processors 108. The processor 108 may be any device, collection of devices and/or components or a system that controls at least one operation or receives and/or executes one or more software programs. The processor 108 may, for example, be one of a digital signal processor, a microcontroller, a micropro-cessor, or a computer programmable logic device. It should be noted that the functionality associated with the processor 108 may be centralized or distributed, whether locally or remotely. The processor 108 is in communication with the receiver 104 and may receive information from the receiver 104, such as audio data 106. As will be described in detail below, the processor 108 and/or other components associated therewith may then transmit or otherwise communicate command data 114 to one or more devices 116, user interface 118, or any other system or apparatus in communication with the processor 108.

The system according to the present invention also includes at least one storage 110. The storage 110 may be any storage, database, memory (e.g., random access memory) or collection thereof including data or information accessible by the system and its components. For example, the storage 110 may include a collection or database of rules 220 such as risk or hazard mitigation rules. The rules may provide information for the system to prevent or mitigate hazardous situations resulting from system errors, such as speech recognition or audio input errors. The rules may be predefined or dynamically generated during operation of the system. The storage 110 may further include system status information 222 including, e.g., information concerning one or more components or devices of the system. The system status information 222 may include, for example, information regarding speech commands received by the system or recognizer 230, device or component operation statuses, actions currently being performed by devices, etc.

The system further includes any number of devices, such as device 116 shown in FIG. 1A. The device 116 may be, for example, a medical device, instrument, tool or system for use in an operating room (e.g., a surgical table, endoscope, etc.). Each device 116 may receive commands or command data 114 from the system. Some devices 116 may also provide feedback or other data to the system.

Some embodiments of the system further include at least one user interface 118 (e.g., graphical user interface). The user interface 118 may be any device for displaying or otherwise providing information or feedback to a user and/or receiving input or information from the user. For example, the user interface 118 may include any number of components such as a monitor or display, a keypad, keyboard, a touch-screen, a mouse, and/or an audio output. In some embodiments, the user interface 118 houses the receiver 104.

Figure 2:
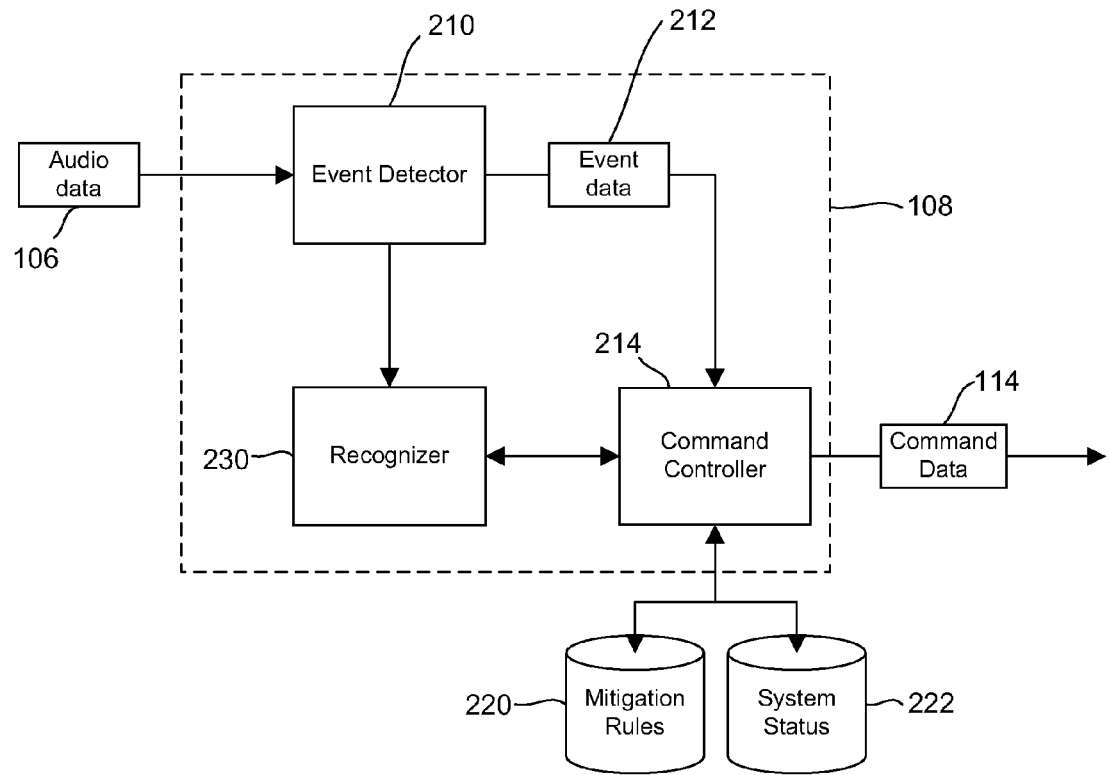
FIG. 2 is another schematic diagram of the system shown in FIG. 1A.

FIG. 2 shows another diagram of a speech recognition and device control system according to the present invention. The system includes any number of components or software applications and/or processes executing on the processor 108. As one of ordinary skill in the art will understand, the software of the system may be stored or located either local or remote to the processor 108, e.g., in a database and/or temporary memory (e.g., the storage 110). As shown, the system includes an event detector 210 for analyzing the audio input 102 (and/or audio data 106 generated therefrom) and identifying at least one event of the audio input 102. The event detector 210 may be embodied in hardware, software or a combination thereof. For example, the event detector 210 may include event detector software executing on the processor 108 as shown in FIG. 2.

The event detector 210 analyzes the audio input 102 and/or audio data 106 and identifies events from the audio input 102 in real-time. The events identified by the event detector 210 may include, for example, an utterance start or the beginning of a potential speech command. The event detector 210 may further detect an utterance end or the ending of a speech or other audio input 102. Event data 212 or event detection results are provided in real-time to the command controller 214. For example, the event detector 210 may identify the start of an utterance or speech command and provide information to allow the system to take an immediate action, e.g., based on one or more rules 220, without waiting for the complete utterance or command.

Any number of hazard mitigation rules 220 may be defined or customized by users of the system, or dynamically generated during operation. For example, one rule 220 may provide for any system or device activity to be stopped if an utterance is begun within a predetermined period of time after the activity was commenced, or, e.g., at any time while the action is being performed. Therefore, if a device activity was commenced in error, the activity may be immediately stopped the moment a user starts speaking, i.e., upon the detection of an utterance start event. Unlike prior art systems, users of the present invention need not wait for the system to receive, recognize and process a complete speech command, such as a "stop" command, when time is critical to mitigate a hazard. However, the system according to the present invention is useful for mitigating any hazard including hazards requiring immediate attention and slower hazards (e.g., a moving table, etc).

The rules 220 may further include rules to mitigate conflicting commands. Such rules may be predefined rules and/or dependent on a current system status. For example, if a device such as a pump is operating at an unsafe pressure (e.g., too high) and the system receives a command to further increase the pressure, one of the rules 220 may provide for the system to warn users of the danger, prevent the implementation of the received command, and/or ignore the command.

The event detector 210 may also identify events or characteristics of audio inputs 102 concerning the duration of the audio input 102. For example, one event detected by the event detector 210 may be an utterance that is too long or that the audio input 102 being received and/or recorded exceeds a predetermined duration or threshold. Such event may be, for example, indicative of background noise, speech commands being issued by multiple users, and/or a user's attempt to retract a command. An event may further be an utterance that is too short or an audio input 102 that is shorter than a predetermined duration or threshold. Rules associated with such events may include a rule that prevents any device activity, or restricts the implementation of speech commands, when the utterance duration exceeds or does not meet a predetermined duration, threshold or range.

Other events detected by the event detector 210 may be events concerning the receiver 104 and/or "front-end" of the system. The event detector 210 may identify a malfunction of the receiver 104. For example, the event detector 210 may identify an input channel or receiver disconnection caused by an unplugged or loosely connected receiver 104 or by a cable that is intermittent or severed. With respect to wireless receivers 104, one event may be a receiver 104 that is turned off, out of power, or otherwise malfunctioning. The event detector 210 may also identify the receiver 104 as functioning properly.

The event detector 210 and/or event detection software may detect a disconnection of the sound card 103. In preferred embodiments, the system includes an external sound card 103 that is removably connected to the computer 109, e.g., via a USB connection (see, e.g., FIG. 1B). However some USB soundcards may be inadvertently disconnected from the computer 109. When a disconnection occurs using a Windows operating system, a computer typically switches to another sound recording device if available. If the microphone 105 of the speech recognition system is connected to the USB soundcard 103 and not the newly active sound recording device, the speech recognition system may no longer hear the user's speech and the user will not know why the system is no longer responding. This could be a serious safety concern in an operating room environment. As such, the event detector 210 of the present invention determines when an external sound card 103 is disconnected or unplugged and immediately alerts the user. The system may further initiate any necessary hazard mitigation such as issuing a command to one or more devices to stop an ongoing action or implement a new action.

Any number of rules may be associated with events. For example, the system may temporarily prevent device activities while the event persists. The system may further restrict activities to those which are not likely affected by the present error or event. The system may further generate an alert or notification regarding the event (e.g., via the user interface) or prompt a user to confirm or cancel a hazard mitigation measure.

The event detector 210 of the present invention may further identify input signal error events. Such events include audio inputs 102 that are suspicious or distorted. For example, an input signal error event may include a signal saturation, a stationary strong noise, and/or a speech feature that is out of range.

Shown in FIG. 2, the system also includes a recognizer 230 for interpreting at least a portion of the audio input 102. For example, the recognizer may recognize or identify at least one command word or speech command from the audio input 102, audio data 106 or speech features of the audio input and/or data. The recognizer 230 may be embodied in hardware, software or a combination thereof. For example, the recognizer 230 may include recognizer software executing on the processor 108 as shown in FIG. 2. The recognizer 230 may access or employ any number of language models (not shown) for interpreting audio input 102 and identifying words and commands.

The system further includes a command controller 214 for generating commands. The controller 214 may implement an action (e.g., hazard mitigation action) or generate commands based on an event and at least one rule 220 (e.g., mitigation rule) concerning the event. For example, the controller 214 may receive event data 212 from the event detector 210 and query a set of mitigation rules 220 to determine whether a hazard or risk mitigation measure is needed. The controller may further consult the system status 222, e.g., status of system components and/or devices.

If a hazard or risk mitigation is called for, the controller 214 may send command data 114 or a control command to a device 116 operable by the system. For example, the command data 114 may direct a device 116 to immediately stop an activity (e.g., a device activity that was erroneously started). The command data 114 may further direct a device to perform a different activity or action to prevent or mitigate a hazard. Further, the command data 114 may direct a device to generate an audible or visual warning to users of the system. The controller 214 may also send an acknowledgement or update to the recognizer 230 and/or other components of the system. If the controller 214 determines that no mitigation measure is necessary, the controller 214 may receive a recognition result and/or speech command data from the recognizer and implement the speech command accordingly.

Figure 3:
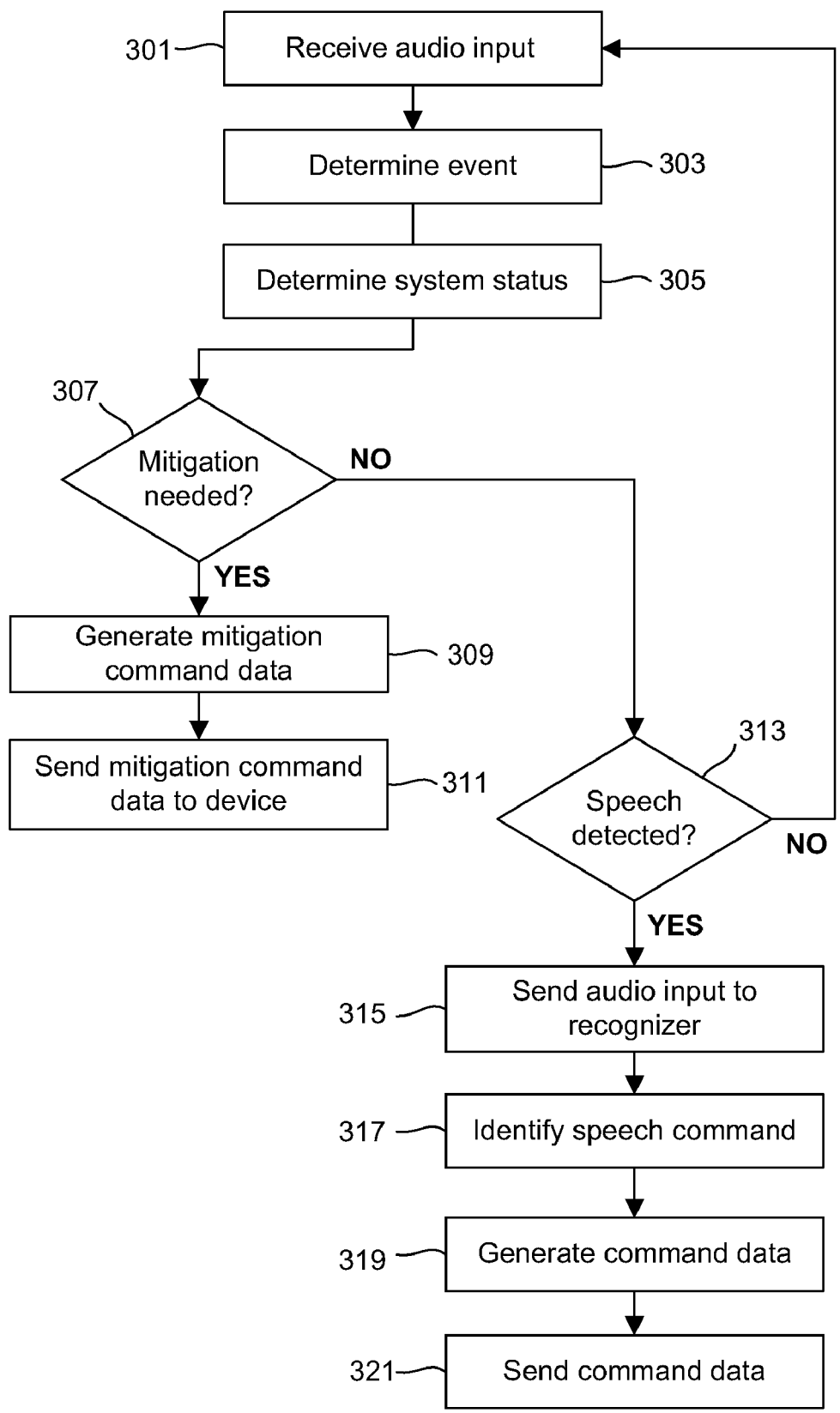
FIG. 3 is a method of mitigation hazards in a voice-driven control system employable by the system shown in FIGS. 1 and 2.

FIG. 3 shows a method of mitigating hazards in a voice-driven control system according to the present invention. The method includes a step of receiving audio input (step 301). The audio input may be a speech input or any other audio input, utterance, noise or signal. At least one event of the audio input may be identified or determined in real-time (step 303). As described above, the event may be, e.g., an utterance start or an utterance end. The event may further concern the duration of the audio input such as audio input duration exceeding a predetermined duration or an audio input duration that is less than a predetermined duration. The event may further be a receiver malfunction or an audio input signal error.

The method of the present invention further includes a step of determining a system status (step 305). The system status may be determined from system status indicator or file (e.g., in the storage 110) or by querying each component of the system. The method further includes determining whether a hazard mitigation action is necessary based on the at least one event, the system status, and at least one rule (step 307). The rule may be, e.g., a risk or hazard mitigation rule 220.

If a risk or hazard mitigation measure is called for, a control command may then be generated, e.g., by the command controller 214, based on the at least one event, the system status, and the at least one rule (step 309). The control command may be sent to a device operable by the voice-driven control system (step 311). The control command may direct a device to immediately stop an activity or action or implement a new action. The control command may also direct a device to issue an audible and/or visual alert, warning or instruction to a user. The control command may also direct the system to stop receiving audio input and/or speech input. The control command may also countermand a speech command to be sent, or previously sent, to a device.

The system continuously monitors and actively seeks for speech commands. When the audio input 102 includes speech or user utterances, the audio input 102 and/or audio data 106 is provided to a recognizer 230 (steps 313-315). The recognizer may then identify one or more speech commands from the audio input and the speech command or command data is sent by the controller to a device or devices operable by the speech command (step 317-321). In some embodiments, the speech command may be modified and/or prevented in accordance with a rule 220.

Although the invention has been described with reference to a particular arrangement of parts, features and the like, these are not intended to exhaust all possible arrangements or features, and indeed many modifications and variations will be ascertainable to those of skill in the art.

What is claimed is:

1. A speech recognition and control system, comprising:
a sound card for receiving speech and converting the speech into digital data, said sound card removably connected to an external input of a computer;
a microphone removably connected to said sound card;
recognizer software executing on the computer for interpreting at least a portion of the digital data;
event detection software executing on the computer for detecting connectivity of said sound card and said microphone and for detecting an event, the event being an utterance start, an utterance end, or an audio input duration exceeding a predetermined duration;
a database including a plurality of rules, the plurality of rules being predefined rules that are dependent on a current system status, and the plurality of rules comprising one or more rules to implement an action or to stop an action upon detecting the disconnection of said sound card, and the plurality of rules having one rule that provides for any system or device activity to be stopped if the utterance is begun within a predetermined period of time after the activity was commenced;
command control software executing on the computer for generating at least one command based on at least one of the digital data, the connectivity of at least one of said sound card and said microphone and at least one rule;
a plurality of devices controllable by the system; and
wherein, if a disconnection of said sound card or said microphone is detected, the at least one command generated by said command control software directs at least one of said devices controllable by the system to stop an action in progress or commence an action to mitigate a hazard without user intervention.

2. A speech recognition and control system, comprising:
a sound card for receiving speech and converting the speech into digital data, said sound card removably connected to an external input of a computer;
recognizer software executing on the computer for interpreting at least a portion of the digital data;
event detection software executing on the computer for detecting connectivity of said sound card;
a plurality of devices controllable by the system;
a database including a plurality of rules, the plurality of rules comprising rules to implement an action or stop an action of at least one of said devices upon detecting a disconnection of said sound card;
command control software executing on the computer for generating device commands based on at least one of the digital data, the plurality of rules, and the connectivity of said sound card;
wherein, if said event detection software detects the disconnection of said sound card, said command control software generates at least one device command directing at least one of said devices controllable by the system to stop an action in progress or commence an action to mitigate a hazard without user intervention.

3. The system according to claim 2, wherein the input is a universal serial bus input.

4. The system according to claim 2, further comprising software for generating an alert if the disconnection of said sound card is detected.

5. The system according to claim 4, further comprising:
a user interface including a monitor;
wherein the alert is at least one of an audible alert and a visual alert communicated via the monitor.

6. The system according to claim 2, wherein said event detection software further detects a malfunction of said sound card.

7. The system according to claim 2, wherein the at least one command further directs a second one of said devices to commence an action if a disconnection of said sound card is detected.

8. The system according to claim 2, further comprising:
a microphone removably connected to said sound card.

9. The system according to claim 8, wherein said event detection software further detects connectivity of said microphone.

10. The system according to claim 2, wherein said event detection software further detects an event, the event being an utterance start, an utterance end, or an audio input duration exceeding a predetermined duration.

11. The system according to claim 10, wherein said database further comprises at least one rule that provides for an activity of at least one of said devices to be stopped if the utterance is begun within a predetermined period of time after the activity was commenced.

12. The system according to claim 2, wherein said at least one devices directed to stop an action in progress or commence an action to mitigate a hazard without user intervention include at least one of an endoscope and a surgical table.

13. A method of mitigating hazards in a voice-driven control system, comprising the steps of:
removably connecting a sound card external to a computer via an input;
receiving speech via the sound card;
converting the speech into digital data;
determining connectivity of the sound card;
determining a system status;
determining whether a hazard mitigation action is necessary based on at least one of the digital data, the connectivity of the sound card, and at least one rule provided by a database including a plurality of rules, the plurality of rules comprising rules to implement an action or stop an action of at least one of a plurality of devices connected to the voice-driven control system upon detecting a disconnection of said sound card;
generating at least one command based on at least one of the digital data, the connectivity of the sound card, and the at least one rule, wherein, if a disconnection of said sound card is detected, said at least one command directs at least one of the devices connected to the voice-driven control system to stop an action in progress or commence an action to mitigate a hazard without user intervention; and
sending the at least one command to the at least device connected to the voice-driven control system.

14. The method according to claim 13, wherein the input is a universal serial bus input.

15. The method according to claim 13, further comprising the step of:
generating an alert if a disconnection of the sound card is detected.

16. The method according to claim 15, wherein the alert is at least one of an audible alert and a visual alert communicated via a monitor.

17. The method according to claim 13, wherein the at least one command further directs a second device connected to the voice-driven control system to commence an action if a disconnection of the sound card is detected.

18. The method according to claim 13, further comprising the step of determining connectivity of a microphone removeably connected to the sound card.

19. The method according to claim 13, wherein said at least one devices directed to stop an action in progress or commence an action to mitigate a hazard without user intervention includes a surgical table.

* * * * *